United States Patent [19]
McBride

[11] Patent Number: 4,602,891
[45] Date of Patent: Jul. 29, 1986

[54] OPEN WEDGE SOCKET

[76] Inventor: Arlen P. McBride, R. R. #1, Box 37, Lewisville, Ind. 47352

[21] Appl. No.: 732,673

[22] Filed: May 10, 1985

[51] Int. Cl.[4] ............................................. F16G 11/04
[52] U.S. Cl. .................................. 403/211; 24/136 K
[58] Field of Search ......... 403/211; 24/136 R, 136 K, 24/136 L

[56] References Cited

U.S. PATENT DOCUMENTS

| | | | |
|---|---|---|---|
| 1,355,004 | 10/1920 | Sandford . | |
| 1,745,449 | 2/1930 | Poor . | |
| 2,217,042 | 10/1940 | Bowman | 24/126 |
| 2,372,754 | 4/1945 | Wickens | 81/18 |
| 2,482,231 | 9/1949 | White | 24/132 |
| 3,335,470 | 8/1967 | Baer | 403/211 |
| 3,654,672 | 4/1972 | Bullar | 24/136 |
| 3,957,237 | 5/1976 | Campbell | 248/1 |

FOREIGN PATENT DOCUMENTS

| | | | |
|---|---|---|---|
| 596257 | 8/1925 | France | 403/211 |
| 595563 | 12/1947 | United Kingdom | 403/211 |
| 2080389 | 4/1981 | United Kingdom . | |

Primary Examiner—Andrew V. Kundrat
Attorney, Agent, or Firm—Barnes & Thornburg

[57] ABSTRACT

An open wedge socket for a cable or the like includes a wedge having a peripheral surface for engaging the cable, a housing including an outwardly opening channel for receiving the wedge and cable, and an interference member having a sliding fit on the housing to capture the wedge and cable in the channel. The channel provides a first working surface for engaging the cable and the interference member provides a second working surface for engaging the cable. The housing includes shoulders providing first camming surfaces and the interference member includes flanges providing second camming surfaces. When the interference member slides onto the housing it is drawn toward the channel to constrict one end of the channel and capture the wedge and cable between the first and second working surfaces.

8 Claims, 5 Drawing Figures

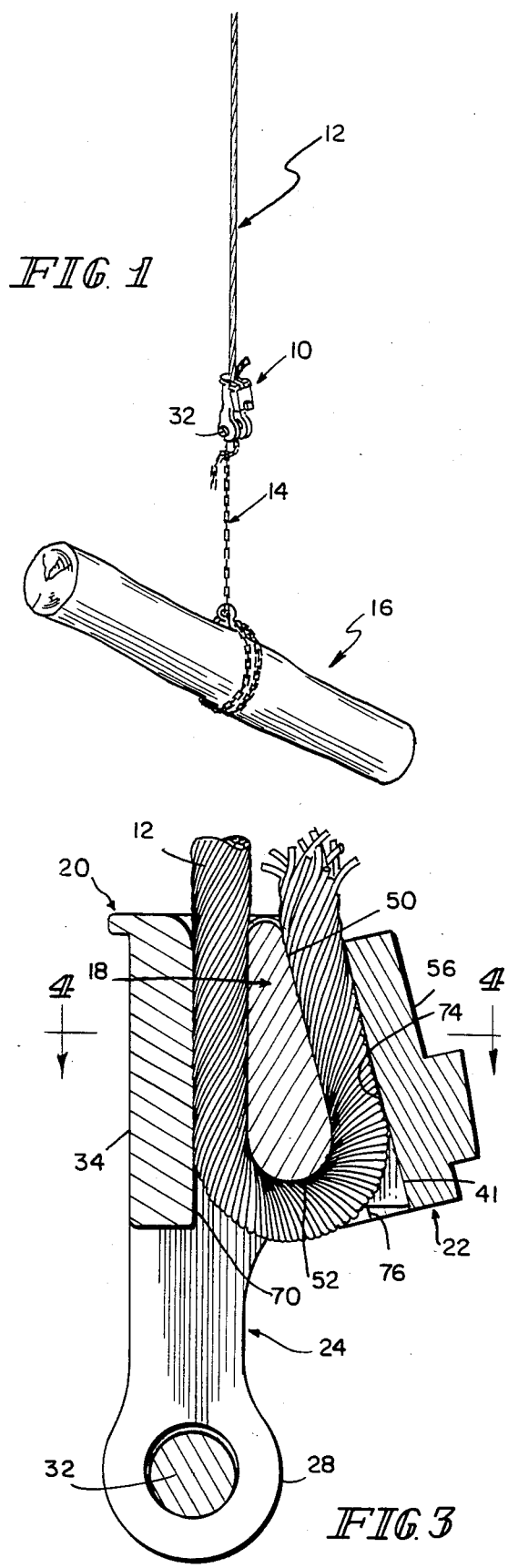
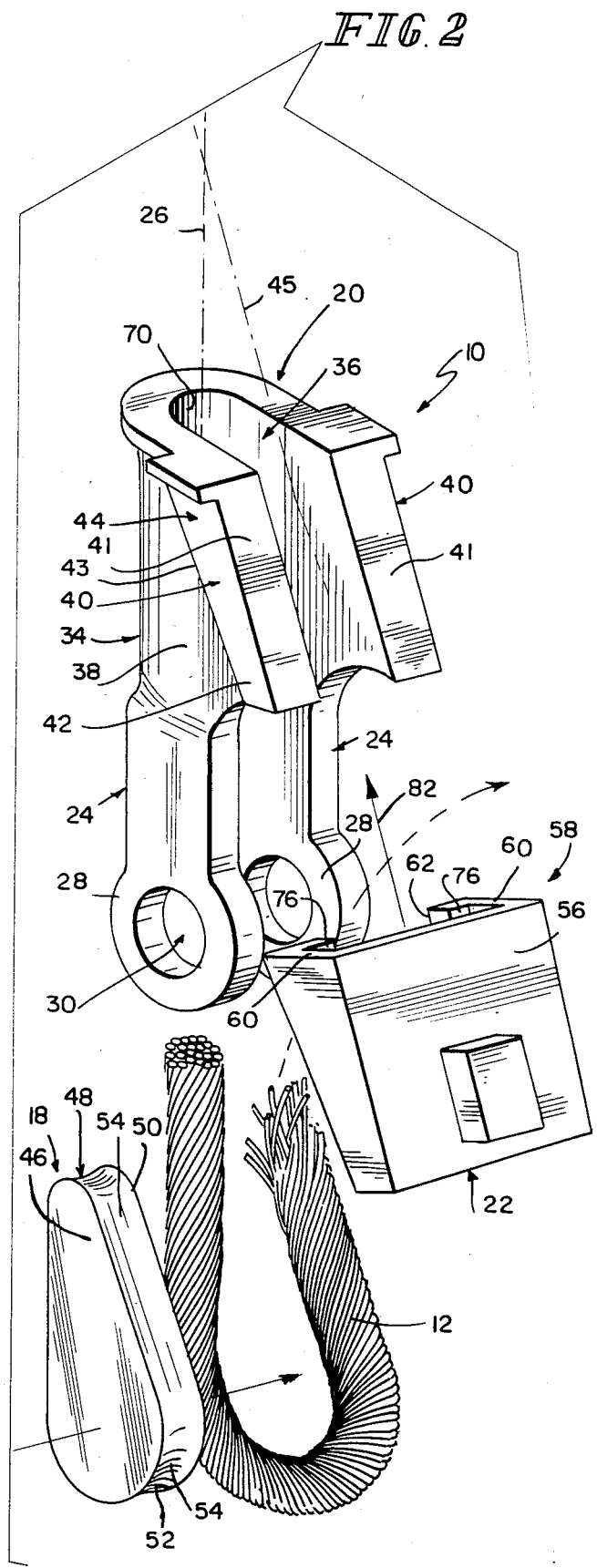

OPEN WEDGE SOCKET

This invention relates to clamping devices for cables and particularly to an improved open wedge socket for clamping the cable and facilitating release of the cable from the socket.

Open wedge sockets are typically used with cranes or other hoisting machines. The socket is attached to the free end of a cable or the like that is suspended from the crane. The socket provides means for coupling the free end of the cable to buckets or other apparatus which are then lifted or transported by the crane.

Conventional open wedge sockets include a wedge member and a socket for receiving the wedge member. A cable is captured in the socket by passing the free end of the cable through the socket, laying the wedge on the cable, and returning the free end of the cable over the wedge and back through the socket. The cable bearing wedge is then driven into the socket with sufficient force to trap the cable and wedge within the socket. Examples of these conventional open wedge sockets are shown in U.S. Pat. Nos. 1,355,004; 1,745,449; 2,217,042; 2,372,754; 2,482,231; 3,654,672; and 3,957,237.

A slightly different example of a conventional open wedge socket is shown in Great Britain Patent No. 2,080,389. In this example, there are two wedge sections, one stationary and integral with the socket and the other movable into the socket to grip a cord. The cord is laid in the socket over the stationary wedge section and the moveable section is forced into the socket. This socket has the same problems as the other conventional sockets discussed above.

It is often necessary to release the cable from the wedge socket. In the conventional wedge sockets, the wedge must be driven out of the socket and the free end of the cable must be pulled back into and through the socket. The free end of the socket frequently becomes kinked or frayed during normal use of the wedge socket. A slight kink or fray can effectively prevent a user from driving the wedge out of the socket. Further, the damaged free end will not pass back through the conventional socket. Heretofore, the only solution to this problem has been to cut the damaged cable to remove the frayed or kinked end.

Removal of the captured cable and wedge from a conventional wedge socket can also be hampered by the buried nature of the wedge itself. Because of the weight that is repeatedly carried on the socket during lifting operations, the wedge is typically forced into the socket so tightly that it is necessary to remove the wedge with a sledgehammer. The wedge is generally contained or buried within the socket so that it is unreachable by the head of the sledgehammer. Heavy-duty punches or levers may be required to enable the sledgehammer to reach and strike a buried wedge.

Removal of the wedge and cable in the manner described above is a cumbersome, labor intensive, time-consuming exercise and many times results in destruction of the cable. Because of the time and labor involved the wedge and cable removal process associated with conventional wedge sockets is also very costly, resulting in extended periods of equipment downtime and inefficient use of personnel.

An open wedge socket embodying the present invention includes a detachable cover that is easily and quickly removable to expose the captured cable and wedge. The present invention avoids the shortcomings of conventional wedge sockets by making it unnecessary to strike the buried wedge or to pull a frayed or kinked wire rope back through a confined socket aperture.

In accordance with the present invention, an open wedge socket includes a wedge, an elongated housing providing a channel for receiving the wedge, and detachable cover for embracing the housing to capture the wedge. The free end of a wire, rope or other flexible cable is looped over the wedge. The wedge with the looped free end of the cable is positioned in the channel along the longitudinal axis of the elongated housing. The cover frictionally engages the housing to capture the cable and wedge in the channel. The improved open wedge socket of the present invention includes a two piece socket and a wedge which allow release of the cable from the socket within a relative short period of time regardless of the condition of the cable.

The wedge can include an endless peripheral surface. Desirably, a groove is formed in a portion of the endless peripheral surface to permit the flexible cable to be wrapped around and aligned within the housing. The endless peripheral surface can include a pair of spaced-apart elongated side walls. In the illustrative embodiment, the wedge is "pear-shaped" in longitudinal cross-section.

The channel is desirably U-shaped in transverse cross section. The housing provides a pair of planar outer surfaces aligned in spaced relation and a wedge-receiving cavity or opening therebetween providing the channel. The elongated housing further includes a pair of oppositely extending shoulders. Each shoulder extends along an uppermost edge of one of the outer surfaces to border the cavity along the length of the elongated housing. Each shoulder is tapered along its length and each includes first and second ramp surfaces. Each ramp surface extends along the length of the elongated housing. One of ramp surfaces is inclined with respect to the other ramp surface to provide the shoulder taper.

The cover is generally rectangular in shape and covers the cavity of the U-shaped elongated member. The cover includes sleeve means for slidably engaging the pair of longitudinally extending tapered shoulders on the housing. Preferably, the sleeve means includes a pair of flanges or skirts depending from opposite edges of the cover. Each sleeve means includes an inturned lip for engaging the shoulders. Each lip projects inwardly from the lowermost edge of the flange to define a trough of progressively narrowing width over the length of the cover. Preferably, each trough is shaped to complement one of the longitudinally extending tapered shoulders on the housing.

Sliding engagement of the cover on the housing causes the lipped flanges of the sleeve means to mate with the complementary tapered shoulders of the housing. When a cable-bearing wedge is received within the wedge housing, the sliding engagement of the cover and wedge housing causes the cover to override and compress the bight of the cable aligned within the housing to tightly capture the cable within the socket. Objects such as buckets or chains may attached to the anchored wedge socket to permit such unwieldy objects to be suspended by the cable.

The invention can best be understood by referring to the following description and accompanying drawings which illustrate a preferred embodiment exemplifying the best mode of carrying out the invention as presently perceived.

In the drawings:

FIG. 1 is an isometric view of an open wedge socket embodying the invention showing the socket anchored to a suspended flexible cable and a log-bearing chain connected to a portion of the open wedge socket;

FIG. 2 is an exploded isometric view of the invention shown in FIG. 1 showing the manner in which a bight of flexible cable is wrapped around a wedge so that the cable and wedge are receivable within a wedge housing prior to attachment of a wedge housing cover;

FIG. 3 is a transverse view, partially cross-sectioned, of the open wedge socket shown in FIG. 1;

Figure 4:
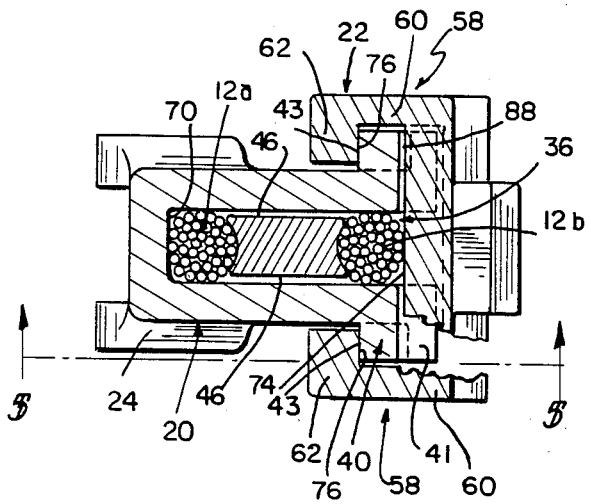
FIG. 4 is a transverse view, partially cross-sectioned and broken away, of the open wedge socket shown in FIG. 1 taken along line 4—4 of FIG. 3.

A open wedge socket 10 of the present invention is anchorable, in a manner to be described, to a bight of a suspended flexible cable 12 as shown in FIG. 1. The flexible cable may be suspended by a crane or other hoisting means (not shown). The open wedge socket 10 is desirably adapted to permit a crane operator or other user to connect a chain 14 or other device to the socket 10. For illustrative purposes chain 14 is shown coupled to a log 16. It will be understood that the improved wedge socket 10 may be adapted to receive many other types of couplings (not shwon) such as hooks or latches in order to lift other objects such as buckets or crates without departing from the spirit of the claimed invention.

Referring now to FIG. 2, the wedge socket 10 includes a wedge 18, an elongated wedge housing 20, and a wedge housing cover 22. The wedge socket 10 further includes two shanks 24 in spaced-apart parallel relationship to each other. Each shank 24 is formed integral with the elongated wedge housing 20 and each extends parallel to the longitudinal axis 26 of the wedge housing 20. The distal end 28 of each shank 24 includes a transverse aperture 30. Desirably, the apertures 30 are coaxially aligned to permit a rod 32 (see FIGS. 1 and 3) to be journaled between the two shanks 24.

The wedge housing 20 includes an elongated section 34 that is U-shaped in transverse cross-section to provide an opening 36 along the length of the housing 20. The elongated section 34 includes a pair of spaced-apart exterior surfaces 38. The wedge housing 20 is desirably formed from cast steel with appropriate heat treating for toughness and strength or other similar material in accordance with conventional techniques. It will be appreciated that the material used to construct the housing 20 must be capable of withstanding the environment in which the socket 10 will be used.

Figure 5:
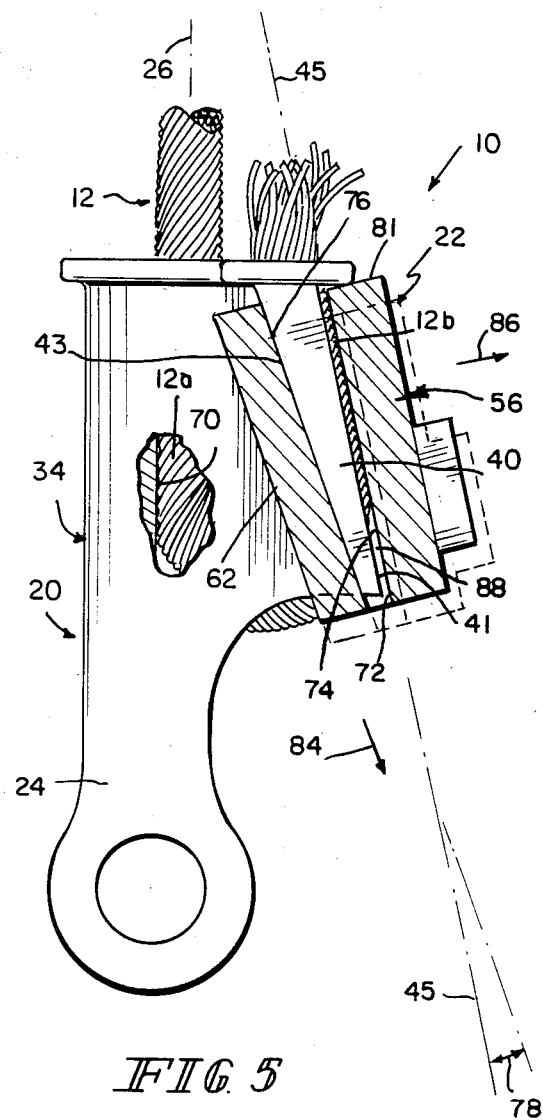
FIG. 5 is a longitudinal view, partially cross-sectioned and broken away, of the open wedge socket shown in FIG. 1 taken along line 5—5 of FIG. 4.

The elongated wedge housing 20 is formed to include a pair of shoulders 40. Each of shoulder 40 projects outwardly from one of the exterior surfaces 38 of the elongated section 34 along the length of the housing 20 as shown in FIG. 2. The shoulders 40 project beyond the exterior surfaces 38 in opposite directions so as not to cover the longitudinal opening 36 in the housing 29. Preferably, each shoulder 40 is tapered along its length so that the converging ends 42 of the shoulders 40 are truncated near one end of housing 20 adjacent to the pair of shanks 24 and the diverging ends 44 of the shoulders 40 are truncated near the other end of housing 20. Each shoulder 40 includes an upper ramp surface 41 and a lower ramp surface 43 as shown in FIGS. 2 and 5. As can be seen in FIG. 2, each shoulder 40 is inclined in a plane represented by line 45. The inclined plane 45 of the shoulder 40 intesects the longitudinal axis 26 of the housing 20 at an acute angle so that cover 22 moves inwardly toward opening 36 as it slides over shoulders 40. As shown in FIG. 3, opening 36 is constricted near the diverging ends 44 of shoulders 40 when the cover is slide into place on the housing 20.

The wedge 18 includes a pair of substantially flat spaced-apart "pear-shaped" faces 46 and an endless peripheral surface 48 of a certain thickness joining the two wedge faces 46 together at their perimeter. In particular, the endless peripheral surface 48 includes a pair of substantially straight, elongated side walls 50 and a curved side wall 52. The straight side walls 50 are desirably spaced-apart and aligned in converging relation along the longitudinal axis of the elongated wedge 18. Further, the pair of straight side walls 50 are united at their diverging ends by the curved side wall 52. In the illustrative embodiment, the wedge 18 is constructed of steel.

The wedge 18 is formed to include a groove 54 in a length of the peripheral surface 48 to receive a flexible cable therein. The grove 54 is formed in straight side walls 50 and curved side wall 52 as shown in FIG. 2. Thus, the flexible cable 12 can be conveniently wrapped substantially around the peripheral surface 48 so that it is aligned and maintained on the wedge 18.

The housing cover or top member 22 includes a rectangular top section 56 for covering the longitudinal opening 36 of the U-shaped elongated section 34 of housing 20. The cover 22 further includes sleeve means 58 for slidably engaging the longitudinally extending housing shoulders 40. The sleeve means 58 includes a pair of elongated flanges 60 as best shown in FIGS. 2 and 4. The flanges 60 depend downwardly from the underside of the rectangular top section 56 in substantially parallel space-relation to each. The sleeve means 58 further includes a pair of inwardly projecting lips 62. Each lip 62 projects inwardly from the lowermost edge of one of the flanges 60, as shown in FIG. 4.

Four substantially planar surfaces 43, 70, 74 and 76 cooperate to provide a interference fit between the wedge-housing 20, the wedge 18, the flexible cable 12, and the detachable cover 22. The relative orientation of these four surfaces will be described to explain a "quick-release" feature of the invention.

Referring now to FIG. 4, the wedge housing 20 is anchored to the flexible cable 12 in the following manner. The housing includes a central working surface 70 and the laterally spaced-apart stationary camming surfaces 43 (i.e. the lower surfaces of the shoulders 40). The detachable cover 22 includes a central working surface 74 and a pair of laterally spaced-apart camming surfaces 76 provided by lips 62. As shown in FIG. 4, the working surface 70 is defined by the bottom wall of the U-shaped channel or opening 36 in housing 20 and working surface 74 is defined by the underside of the cover 22. Further, the camming surfaces 43 are defined by the ramped underside of each tapered shoulder 40 and the camming surfaces 76 are defined by the upwardly facing ramped ledges of each inwardly projected lip 62. Surfaces 70 and 74 are referred to as "working" surfaces since these two surfaces contact upper and lower portions of the flexible cable 12 as shown in FIGS. 3 and 4 to effect the interference fit. Thus, working surfaces 70 and 74 clamp the flexible cable 12 looped around the wedge 18 to cause the improved open wedge socket 10 to be anchored to the cable 12. Surfaces 43 and 76 are referred to as "camming" surfaces since the pairs of surfaces are mutually engaged in sliding contact along their length as shown in FIGS. 2 and 5. Thus, camming surfaces 43 and 76 retain the wedge housing 20 and cover 22 in proper alignment during engagement.

The relative orientation between the working surfaces 70,74 and the camming surfaces 43,76 is important because this relationship provides the open wedge socket 10 of the present invention with a "quick-release" feature. The trapped cable-bearing wedge 18 is easily removed from the wedge housing 20 not only because of the novel detachable cover 22 but also because of the "quick-release" feature provided by the relative orientation of the working surfaces 70,74 and the camming surfaces 43,76. Particularly, the dihedral angle 78 between the plane of the working surface 74 and the plane of the stationary camming surfaces 43 provides a tight interference fit that is quickly released. In the preferred embodiment angle 78 is approximately seven degrees (7°). It should be understood that dihedral angle 78 may be increased slightly to enable a user to more easily remove the wedge cover 22 or decreased slightly to subdue the "quick-release" effect attributable to the relative orientation of surfaces 43 and 74. For example the angle 78 could be between three degrees (3°) and twelve degrees (12°) without departing from the scope of the invention.

The improved open wedge socket 10 is operated in the following manner to trap a wire, rope, or other flexible cable 12 within the wedge housing 20. Referring now to FIG. 2, a bight of the cable 12 is wrapped around the elongated wedge 18 to align the cable 12 within the groove 54 formed in the peripheral surface 48. The cable-bearing wedge 18 is positioned within the U-shaped channel 36 of the housing 20. The wedge 18 may be either lowered or slid into its proper position in housing 20. As shown in FIGS. 2 and 3, wedge 18 is placed in channel or opening 36 so that the widest portion of the wedge 18 (adjacent to edge 52) is near the converging ends 42 of the shoulders 40. Subsequently, the detachable cover 22 is movable in the direction indicated at 82 to mate with the wedge housing 20. The wedge cover 22 is aligned with the wedge housing 20 to cause the diverging space between the lip ledges or camming surfaces 76 and the cover underside or working surface 74 to be adjacent to the converging ends 42 of the tapered shoulders 40. Once aligned, the so-called "sleeves" 58 of the wedge cover 22 are slidable onto the tapered "shoulders" 40 of the wedge housing 20 to cover the longitudinal opening 36 in the housing 20 and to form an interference fit between the working surface 70, a lower portion 12a of the cable 12, the wedge 18, an upper portion 12b of the cable 12, and the working surface 74 as shown in FIGS. 3 and 4. As best shown in FIG. 2 once the cover 22 is in place, opening 36 adjacent to the diverging ends 44 of shoulders 40 is constricted to prevent the wedge 18 and cable 12 from being pulled out of housing 20. In point of fact, as weight is placed on the shanks 24 the interference fit becomes tighter.

The improved open wedge socket 10 is operated in a similar manner to quickly release the flexible cable 12 from its captured position within the wedge housing 20. Referring now to FIG. 5, the anchored open wedge socket 10 is disengaged from the cable 12 by striking the wedge cover 22 along an edge 81 with an instrument (not shown) such as a sledgehammer. The wedge cover 22 will move in the direction indicated by arrow 84 in response to contact with the edge 81. As the sleeves 58 of the wedge cover 22 are withdrawn from engagement with the tapered shoulders 40 of the wedge housing 20, the camming surface 76 will slide on the camming surfaces 43 over the length of the shoulders 40. Because of the relationship between the camming surfaces 43 and 76 the working surface 74 will immediately disengage from contact with the captured cable 12 and begin to move away from cable 12 in a direction indicated by arrow 86 as shown in dotted lines in FIG. 5. Disengagement is effective in response to the slightest movement of cover 22 in direction 84. The trapped cable 12 is quickly released due to the relative orientation of the surfaces 43,74,76. Particularly, the fixed dihedral angle 78 between the interference-provoking working surface 74 and the camming surface 76 causes a gap 88 between the upper ramp surfaces 41 shoulders 40 and the working surface 74 to widen considerably as the wedge cover 22 is withdrawn in direction 84 to release the cable 12. Thus, the interference fit between the working surface 70, the flexible cable 12, the wedge 18, and the working surface 74 is loosened without having to withdraw the wedge cover 22 along the entire length of tapered shoulders 40. It will be understood that this "quick-release" feature permits release of the cable 12 without cutting the cable 12 and without driving the wedge 18 out of the housing 20. Even if the end of cable 12 is kinked or knotted, the cable 12 can be quickly and easily removed.

Although the invention has been described in detail with reference to certain preferred embodiments, variations and modifications exist within the scope and spirit of the invention as described and defined in the following claims.

What is claimed is:

1. An apparatus for gripping a bight of a cable or the like, comprising
a housing, the housing including a channel for receiving the bight of the cable, the channel providing a first working surface,
an interference member, the interference member including a second working surface, and
camming means providing a sliding fit between the interference member and the housing so that the first and second working surfaces are in opposed relationship to each other, the camming means including a first camming surface on the housing and a second camming surface on the interference member which when engaged move the two working surfaces toward each other to progressively narrow the channel as the interference member is cammed inwardly and capture the bight of the cable therebetween.

2. The apparatus of claim 1 wherein the camming means includes a shoulder on the housing providing the first camming surface and a flange on the interference member providing the second camming surface.

3. An apparatus for gripping a cable or the like, comprising:
a wedge having a surface for engaging the cable,
a housing, the housing including an outwardly opening channel for receiving the wedge and the cable, the channel providing a first working surface,
an interference member, the interference member including a second working surface, and camming means providing a sliding fit between the interference member and the housing, the camming means including a first camming surface on the housing and a second camming surface on the interference member which when engaged move the two working surfaces toward each other to progressively narrow the channel as the interference member is cammed inwardly and capture the wedge and cable in the channel between the first and second working surfaces.

4. The apparatus of claim 3 wherein the first camming surface lies in a first plane, and the second working surface lies in a second plane at an acute dihedral angle with respect to the first plane.

5. The apparatus of claim 3 wherein the camming means includes a shoulder on the housing providing the first camming surface and a flange on the interference member providing the second camming surface.

6. The apparatus of claim 5 wherein the housing has a longitudinal axis and the shoulder is inclined with respect to the longitudinal axis of the housing so that the interference member moves at angle with respect to the longitudinal axis of the housing to constrict the channel and is drawn inward against the wedge and cable by the first and second camming surfaces.

7. The apparatus of claim 6 wherein the flange on the interference member includes an inturned lip providing the second camming surface in opposed spaced relationship to the second working surface; the second camming surface being inclined at the same acute dihedal angle as the first camming surface with respect to the second working surface.

8. A method of attaching a socket to the free end of a cable or the like, comprising the steps of:
placing a bight of the cable on the periphery of a wedge,
positioning the cable-bearing wedge in an open channel within the socket,
sliding a top member over the open channel at an acute angle with respect to the longitudinal axis of the channel, and camming the top member inwardly toward the channel to progressively narrow the channel to capture the cable-bearing wedge between a bottom surface of the channel and a surface of the top member.

* * * * *